United States Patent
Lopez (10) Patent No.: US 12,463,706 B2
(45) Date of Patent: Nov. 4, 2025

(54) MULTI-USER PHYSICAL LAYER PACKET FOR SENSING

(71) Applicant: Telefonaktiebolaget LM Ericsson (publ), Stockholm (SE)

(72) Inventor: Miguel Lopez, Solna (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 486 days.

(21) Appl. No.: 18/004,698

(22) PCT Filed: Jul. 10, 2020

(86) PCT No.: PCT/EP2020/069528
§ 371 (c)(1),
(2) Date: Jan. 9, 2023

(87) PCT Pub. No.: WO2022/008069
PCT Pub. Date: Jan. 13, 2022

(65) Prior Publication Data
US 2023/0268975 A1    Aug. 24, 2023

(51) Int. Cl.
*H04B 7/06* (2006.01)
*H04W 16/28* (2009.01)
*H04W 84/12* (2009.01)

(52) U.S. Cl.
CPC .......... *H04B 7/0697* (2013.01); *H04W 16/28* (2013.01); *H04W 84/12* (2013.01)

(58) Field of Classification Search
CPC .. H04B 7/0697; H04B 7/0617; H04B 7/0639; H04W 16/28; H04W 84/12; H04W 48/10; H04W 4/023; H04W 24/08
See application file for complete search history.

(56) References Cited

U.S. PATENT DOCUMENTS

| | | |
|---|---|---|
| 2010/0035627 A1 | 2/2010 | Hou et al. |
| 2019/0028168 A1 | 1/2019 | Vermani et al. |
| 2019/0261393 A1* | 8/2019 | Wu .......... H04W 72/23 |
| 2019/0372631 A1 | 12/2019 | Taira et al. |

OTHER PUBLICATIONS

International Search Report and Written Opinion dated Mar. 25, 2021 for International Application No. PCT/EP2020/069528 filed on Jul. 10, 2020, consisting of 13 pages.

(Continued)

*Primary Examiner* — Fred A Casca
(74) *Attorney, Agent, or Firm* — Weisberg I.P. Law, P.A.

(57) ABSTRACT

A method is disclosed of a transmitter configured to transmit more than one spatially multiplexed streams having a multi-user physical layer packet for a plurality of users. The plurality of users includes a first type user and a second type user. A first stream is assigned for the first type user and a second stream is assigned for the second type user. The method includes leaving a data field of the physical layer packet empty for the first type user, providing second type user emission strength (in a spatial direction towards the first type user) that falls below a threshold value by controlling a spatial emission pattern associated with the second type user for the physical layer packet, and transmitting the physical layer packet.

20 Claims, 2 Drawing Sheets

(56) References Cited

OTHER PUBLICATIONS

C. Da Silva et al., A Channel Measurement Procedure for WLAN Sensing; doc: IEEE 802.11-20/0842r0; dated Jun. 3, 2020, consisting of 14 pages.
D. Lopez-Perez et al., Downlink spatial reuse parameter framework with coordinated beamforming/null steering for 802.11be; doc: IEEE 802.11-19/1779r6; dated Nov. 11, 2019, consisting of 12 pages.
S. Schelstraete et al., Nulling and coordinated beamforming; doc: IEEE 802.11-19/0638; dated Mar. 10, 2019, consisting of 11 pages.
IEEE P802.11ax/D6.0; Draft Standard for Information technology—Telecommunications and information exchange between systems Local and metropolitan area networks-Specific requirements; LAN/MAN Standards Committee of the IEEE Computer Society; Nov. 2019, consisting of 780 pages.
C. Da Silva, 802.11 SENS SG Proposed PAR; doc: IEEE 802.11-19/2103r5; IEEE P802.11 Wireless LANs; dated Jan. 14, 2020; consisting of 4 pages.

* cited by examiner

MULTI-USER PHYSICAL LAYER PACKET FOR SENSING

CROSS-REFERENCE TO RELATED APPLICATION

This application is a Submission Under 35 U.S.C. § 371 for U.S. National Stage Patent Application of International Application Number: PCT/EP2020/069528, filed Jul. 10, 2020 entitled "MULTI-USER PHYSICAL LAYER PACKET FOR SENSING," the entirety of which is incorporated herein by reference.

TECHNICAL FIELD

The present disclosure relates generally to the field of sensing; e.g., wireless local area network (WLAN) sensing. More particularly, it relates to provision of a multi-user physical layer packet in the context of sensing.

BACKGROUND

The IEEE 802.11 standardization group has approved a Project Authorization Request (PAR) for wireless local area network (WLAN) sensing, one object of which is to develop an amendment to the IEEE 802.11 standard as follows.

"This amendment defines modifications to the IEEE 802.11 medium access control layer (MAC), the physical layer (PHY) of Directional Multi Gigabit (DMG), and the PHY under development of Next Generation 60 GHz (NG60) that enhance Wireless Local Area Network (WLAN) sensing (SENS) operation in license-exempt frequency bands between 1 GHz and 7.125 GHz and above 45 GHz. This amendment defines:
at least one mode that enables stations (STAs) to perform one or more of the following: to exchange WLAN sensing capabilities, to request and setup transmissions that allow for WLAN sensing measurements to be performed, to indicate that a transmission can be used for WLAN sensing, and to exchange WLAN sensing feedback and information;
WLAN sensing operation that relies on transmissions that are requested, unsolicited, or both"

Some sensing approaches use statistics based on channel estimates (e.g., changes in the propagation environment). Typically, several channel estimates are made over time and machine learning techniques, or artificial intelligence, are applied to the channel estimates in order to make inferences and/or take decisions based on the changes in the propagation environment (e.g., regarding device positioning, radio environments, etc.).

Channel estimation in IEEE 802.11 is typically based on LTFs. A long training field (LTF) comprises orthogonal frequency division multiplexing (OFDM) symbols which are known at the receiver, and generally intended for channel estimation. A legacy LTF consists of two OFDM symbols, while a high efficiency (HE) LTF consists of a variable number of OFDM symbols depending on how many streams are transmitted.

Also typically in IEEE 802.11, one or more LTFs are located in the physical layer (PHY) preamble of each PHY protocol data unit (PPDU), and sensing STAs can utilize the LTFs for channel estimation.

Generally, PPDUs used for sensing may also carry data, and the recipient of the data may be the sensing STA or another STA. One example is a multi-user PPDU where a first stream is for a sensing STA and a second stream is for another (non-sensing) STA.

However, performance of the sensing STA, and/or of the non-sensing STA, based on a multi-user PPDU may be unsatisfactory (e.g., in comparison to performance based on a single-user PPDU).

Therefore, there is a need for alternative approaches to provision of multi-user physical layer packets in the context of sensing.

SUMMARY

It should be emphasized that the term "comprises/comprising" (replaceable by "includes/including") when used in this specification is taken to specify the presence of stated features, integers, steps, or components, but does not preclude the presence or addition of one or more other features, integers, steps, components, or groups thereof. As used herein, the singular forms "a", "an" and "the" are intended to include the plural forms as well, unless the context clearly indicates otherwise.

Generally, when an arrangement is referred to herein, it is to be understood as a physical product; e.g., an apparatus. The physical product may comprise one or more parts, such as controlling circuitry in the form of one or more controllers, one or more processors, or the like.

It is an object of some embodiments to solve or mitigate, alleviate, or eliminate at least some of the above or other disadvantages.

A first aspect is a method of a transmitter configured to transmit more than one spatially multiplexed streams comprised in a multi-user physical layer packet for a plurality of users. The plurality of users comprises a first type user and a second type user. A first stream is assigned for the first type user and a second stream is assigned for the second type user.

The method comprises leaving a data field of the physical layer packet empty for the first type user, providing second type user emission strength, in a spatial direction towards the first type user, that falls below a threshold value by controlling a spatial emission pattern associated with the second type user for the physical layer packet, and transmitting the physical layer packet.

In some embodiments, the method further comprises transmitting an announcement indicative of that the data field of the physical layer packet is empty for the first stream.

In some embodiments, the announcement is comprised in one or more of: a broadcast signal, a beacon signal, a receiver-dedicated signal, and a header field of the physical layer packet.

In some embodiments, transmitting the physical layer packet comprises using a first transmitter configuration for the first stream and using a second transmitter configuration for the second stream.

In some embodiments, the first transmitter configuration is an omni-directional transmitter configuration.

In some embodiments, the second transmitter configuration provides beamformed transmission towards the second type user.

In some embodiments, the method is applied for a plurality of consecutive physical layer packets.

In some embodiments, the first type user is a wireless communication device configured to use the physical layer packet for wireless local area network (WLAN) sensing and the second type user is a wireless communication device configured to use the physical layer packet for data reception.

In some embodiments, the physical layer packet is a physical layer (PHY) protocol data unit (PPDU), or a high efficiency (HE) PPDU, or an extremely high throughput (EHT) PPDU.

In some embodiments, the transmitter is configured to transmit the physical layer packet in accordance with a listen-before-talk procedure.

In some embodiments, the transmitter is configured to operate in accordance with one or more of: an IEEE 802.11ax standard, an IEEE 802.11be standard, and an IEEE 802.11bf standard.

A second aspect is a method of a receiver for a second type user. The method comprises receiving a multi-user physical layer packet comprising more than one spatially multiplexed streams, wherein a first stream is assigned for a first type user and a second stream is assigned for the second type user, and controlling interference mitigation based on that a data field of the physical layer packet is empty for the first type user.

In some embodiments, the method further comprises receiving an announcement indicative of that the data field of the physical layer packet is empty for the first stream.

In some embodiments, a default interference mitigation comprises interference cancellation, and controlling interference mitigation comprises applying interference suppression for the first stream instead of interference cancellation.

A third aspect is a method of a receiver for a first type user. The method comprises receiving a multi-user physical layer packet comprising more than one spatially multiplexed streams, wherein a first stream is assigned for the first type user and a second stream is assigned for a second type user, performing channel estimation based on at least one measurement signal for channel estimation comprised in the physical layer packet for the first stream, and refraining from processing of a data field of the physical layer packet.

In some embodiments, the method further comprises receiving an announcement indicative of that the data field of the physical layer packet is empty for the first stream.

In some embodiments, the method further comprises using a channel estimation result for wireless local area network (WLAN) sensing.

A fourth aspect is a computer program product comprising a non-transitory computer readable medium, having thereon a computer program comprising program instructions. The computer program is loadable into a data processing unit and configured to cause execution of the method according to any of the first, second, and third aspects when the computer program is run by the data processing unit.

A fifth aspect is an apparatus for a transmitter configured to transmit more than one spatially multiplexed streams comprised in a multi-user physical layer packet for a plurality of users. The plurality of users comprise a first type user and a second type user. A first stream is assigned for the first type user and a second stream is assigned for the second type user.

The apparatus comprises controlling circuitry configured to cause a data field of the physical layer packet to be left empty for the first type user, provision of second type user emission strength, in a spatial direction towards the first type user, that falls below a threshold value by control of a spatial emission pattern associated with the second type user for the physical layer packet, and transmission of the physical layer packet.

A sixth aspect is an apparatus for a receiver for a second type user. The apparatus comprises controlling circuitry configured to cause reception of a multi-user physical layer packet comprising more than one spatially multiplexed streams, wherein a first stream is assigned for a first type user and a second stream is assigned for the second type user, and control of interference mitigation based on that a data field of the physical layer packet is empty for the first type user.

A seventh aspect is an apparatus for a receiver for a first type user. The apparatus comprises controlling circuitry configured to cause reception of a multi-user physical layer packet comprising more than one spatially multiplexed streams, wherein a first stream is assigned for the first type user and a second stream is assigned for a second type user, performance of channel estimation based on at least one measurement signal for channel estimation comprised in the physical layer packet for the first stream, and refraining from processing of a data field of the physical layer packet.

An eighth aspect is a wireless communication device comprising the apparatus of any of the fifth, sixth, and seventh aspects.

In some embodiments, any of the above aspects may additionally have features identical with or corresponding to any of the various features as explained above for any of the other aspects.

An advantage of some embodiments is that alternative approaches are provided to provision of multi-user physical layer packets in the context of sensing.

An advantage of some embodiments is that disturbance caused to a non-sensing device by transmission to a sensing device may be reduced compared to other approaches for provision of multi-user physical layer packets.

An advantage of some embodiments is that disturbance caused to a sensing device by transmission to a non-sensing device may be reduced compared to other approaches for provision of multi-user physical layer packets.

An advantage of some embodiments is that spatial multiplexing of sensing and non-sensing devices is enabled, while—compared to single user (SU) transmissions—sensing performance is not (or only slightly) degraded and/or inter-stream interference experienced by the non-sensing device(s) is not (or only slightly) increased. Generally, spatial multiplexing may be considered as resource efficient and/or increase the communication capacity compared to SU transmissions.

Several problems associated with spatial multiplexing of sensing and non-sensing devices may be solved by some embodiments, as exemplified in the following using IEEE 802.11 terminology.

It may be preferable that the same precoding setting is applied to all HE-LTFs within a burst of PPDUs used for sensing. This makes it cumbersome to multiplex non-sensing STAs together with the sensing STAs using different streams, since the non-sensing STAs may require different precoding settings for different PPDUs (e.g., due to mobility of non-sensing STAs and/or different PPDUs being directed to different non-sensing STAs).

Instead of allocating spatial stream(s) to sensing STAs, the sensing STAs could use only the legacy LTF (i.e., not the HE-LTFs) to perform channel estimation. This approach would, however, worsen the sensing performance. For example, the HE-LTFs provide better resolution in the frequency domain, larger bandwidth, and more spatial degrees of freedom (enabling MIMO channel estimation) than do the legacy LTFs.

In either case, there are undesirable consequences that may lead to reduced sensing performance and/or reduced throughput for non-sensing STAs. Such problems may be overcome by application of some embodiments presented herein.

BRIEF DESCRIPTION OF THE DRAWINGS

Further objects, features and advantages will appear from the following detailed description of embodiments, with reference being made to the accompanying drawings. The drawings are not necessarily to scale, emphasis instead being placed upon illustrating the example embodiments.

DETAILED DESCRIPTION

As already mentioned above, it should be emphasized that the term "comprises/comprising" (replaceable by "includes/ including") when used in this specification is taken to specify the presence of stated features, integers, steps, or components, but does not preclude the presence or addition of one or more other features, integers, steps, components, or groups thereof. As used herein, the singular forms "a", "an" and "the" are intended to include the plural forms as well, unless the context clearly indicates otherwise.

Embodiments of the present disclosure will be described and exemplified more fully hereinafter with reference to the accompanying drawings. The solutions disclosed herein can, however, be realized in many different forms and should not be construed as being limited to the embodiments set forth herein.

As is well known, channel estimates can be achieved by performing measurements on received signals, which are transmitted with known content. Such signals are referred to herein as measurement signals, or measurement signals for channel estimation.

Some embodiments are particularly applicable to sensing; e.g., wireless local area network (WLAN) sensing under the standardization of IEEE 802.11.

Generally, a physical layer packet (e.g., physical layer protocol data unit; PPDU) used for sensing may (or may not) also carry data. The recipient of the data may be the sensing device (STA), or may be another receiving device (STA).

Embodiments presented herein generally relate to scenarios where a multi-user (MU) physical layer packet is transmitted which comprises more than one spatially multiplexed streams (e.g., applying multiple-input multiple-output, MIMO, approaches), each stream being assigned to one of a plurality of users. The plurality of users comprises users of different types; a first type user (sensing device; e.g., configured to use the physical layer packet for WLAN sensing) and a second type user (non-sensing device; e.g., configured to use the physical layer packet for data reception). It should be understood that, even if embodiments are exemplified herein for two streams (for one first type user and one second type user, respectively), embodiments may be equally applicable for more than two streams and/or for more than two users.

An applicable scenario for some embodiments is when transmitter and receiver operate in accordance with a listen-before-talk procedure. Generally, references to a listen-before-talk (LBT) procedure are meant to include any procedure where a transmitter is required to perform measurements to determine that the channel is available (e.g., idle) before starting to transmit. Examples include carrier sense multiple access with collision avoidance (CSMA/CA).

In the following, embodiments will be described with alternative approaches for provision of multi-user physical layer packets in the context of sensing.

Generally, even if exemplification is made using a context for IEEE 802.11, it should be noted that some embodiments are equally applicable in other contexts, e.g., sensing within a context of Third Generation Partnership Project (3GPP) standards.

Figure 1:
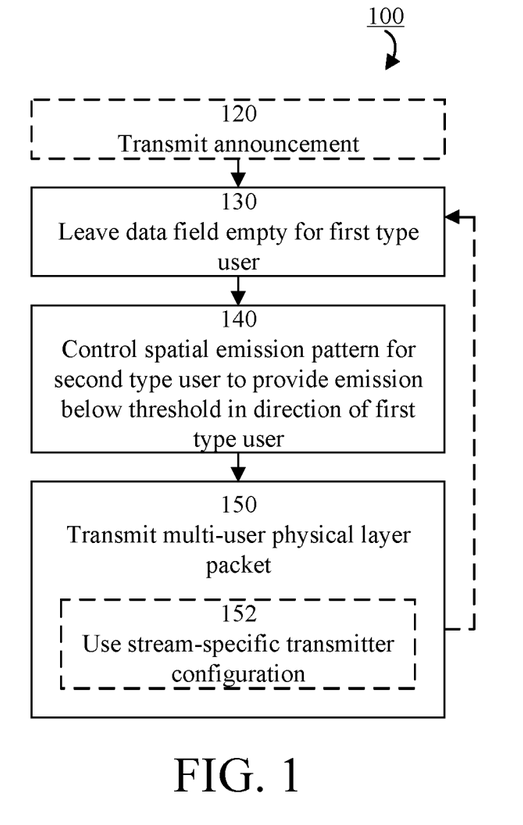
FIG. 1 is a flowchart illustrating example method steps according to some embodiments.
Figure 2:
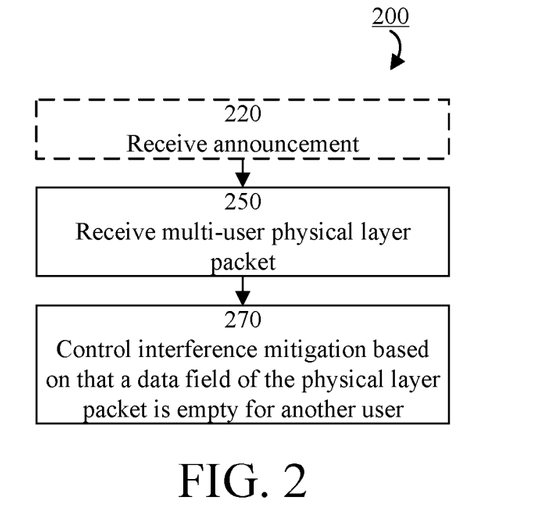
FIG. 2 is a flowchart illustrating example method steps according to some embodiments.
Figure 3:
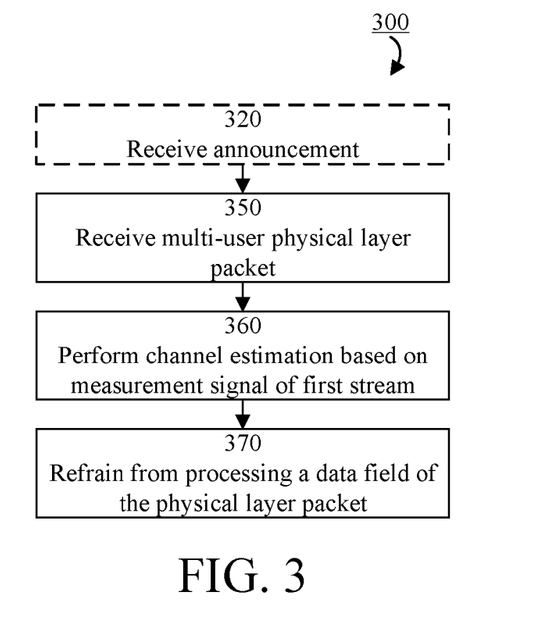
FIG. 3 is a flowchart illustrating example method steps according to some embodiments.

FIG. 1 illustrates an example method 100 for a transmitter (e.g., transmitting device) according to some embodiments, FIG. 2 illustrates an example (corresponding) method 200 for a receiver of a second type user (e.g., receiving non-sensing device) according to some embodiments, and FIG. 3 illustrates an example (corresponding) method 300 for a receiver of a first type user (e.g., receiving sensing device) according to some embodiments. FIGS. 1, 2 and 3 are described in relation to each other in the following.

The method 100 is a method for a transmitter configured to transmit more than one spatially multiplexed streams comprised in a multi-user physical layer packet for a plurality of users comprising a first type user and a second type user, wherein a first stream is assigned for the first type user and a second stream is assigned for the second type user. Correspondingly, the method 200 is a method for a receiver configured to operate as a non-sensing device and to receive a multi-user physical layer packet. Also correspondingly, the method 300 is a method for a receiver configured to operate as a sensing device based on reception of a multi-user physical layer packet.

The transmitter and receivers are typically configured to operate (e.g., transmit/receive the physical layer packet(s)) in accordance with a listen-before-talk procedure. For example, the transmitter and receivers may be configured to operate in accordance with one or more of: an IEEE 802.11ax standard, an IEEE 802.11be standard, an IEEE 802.11bf standard, or any other suitable IEEE 802.11 standard. Thus, the transmitter may be a WLAN transmitter and the receivers may be a WLAN receivers.

When the transmitter is a WLAN transmitter and/or when the receivers are WLAN receivers, the physical layer packet may be a physical layer (PHY) protocol data unit (PPDU), a high efficiency (HE) PPDU, an extremely high throughput (EHT) PPDU, or a physical layer packet which is compatible with any of these PPDU formats; and each measurement signal for channel estimation may correspond to a long training field (LTF), a HE-LTF, or a EHT-LTF.

As illustrated by step 130, the method 100 comprises leaving a data field of the physical layer packet empty for the first type user. Thus, the data field of the first stream is left empty.

One advantage of this approach is that users, other than the first type user (e.g., the second type user), addressed by the multi-user physical layer packet do not experience any interference of the data field from the first stream.

As illustrated by step 140, the method 100 also comprises controlling a spatial emission pattern (e.g., a beamforming pattern) of the second type user for the physical layer packet. The control is performed to provide an emission strength for the second stream that falls below a threshold value in a spatial direction towards the first type user.

One advantage of this approach is that the first type user experiences low (or no) interference from the second stream.

Generally, the threshold value may be any suitable value (e.g., dynamic or static, absolute or relative, etc.). Thus, the control of step 140—to provide an emission strength for the second stream that falls below a threshold value in a spatial direction towards the first type user—may be interpreted as controlling the spatial emission pattern of the second type user to provide a "low enough" emission strength in the spatial direction towards the first type user.

The control exercised in step 140 may be according to any suitable approach. For example, a precoding setting that has a relatively low emission strength in the spatial direction towards the first type user may be selected for application to the second stream (e.g., for beamforming towards the second type user). In some embodiments, step 140 comprises placing a null of the spatial emission pattern of the second type user in the spatial direction towards the first type user.

The physical layer packet is transmitted by the transmitter in step 150. The physical layer packet is received by the receiver for the second type user in step 250, and by the receiver for the first type user in step 350.

Transmitting the physical layer packet according to step 150 may comprise using stream-specific transmitter configuration(s), as illustrated by optional sub-step 152. Generally, a transmitter configuration may, for example, refer to a precoding setting used for transmission (for some or all fields of the physical layer packet, and at least for the measurement signals for channel estimation).

For example, a first transmitter configuration may be used for the first stream and a second transmitter configuration may be used for the second stream. The first and second transmitter configurations may be different according to some embodiments. Alternatively or additionally, either or both of the first and second transmitter configurations may comprise different transmitter configurations for different fields of the PPDU.

The second transmitter configuration may be a transmitter configuration beamformed towards some specific direction(s) (e.g., towards the second type user), for example.

The first transmitter configuration may be an omni-directional transmitter configuration, or a transmitter configuration beamformed towards some specific direction(s) (e.g., direction(s) that are particularly interesting for the sensing device; i.e., direction(s) for which the sensing device would like to get more information, i.e., measurement signals), for example.

An omni-directional transmitter configuration may be achieved using any suitable approach. For example, an omni-directional transmitter configuration may comprise performing a beam sweep using several consecutive physical layer packets. Alternatively or additionally, an omni-directional transmitter configuration may comprise applying cyclic shift diversity.

Although not shown in FIGS. 1 and 3, the sensing device may transmit a request for measurement signal(s). In some embodiments, the request further informs the transmitter about a desired transmitter configuration (e.g., corresponding to direction(s) that are particularly interesting for the sensing device). For example, the request may be indicative of desired precoding settings (e.g., by comprising precoding setting indices corresponding to the desired precoding settings).

Typically, the desired precoding settings may be based on previous channel estimations and/or previous WLAN sensing. For example, the request may be indicative of precoding settings where the sensing device has detected channel variations. Alternatively or additionally, the request may be indicative of spatial directions where the probability of movement is considered to be high (e.g., above a threshold value). Alternatively or additionally, the request may be indicative of spatial directions where information acquired from a sensor indicates movement.

The request may be received by the transmitter device, and the transmitter configuration of sub-step 152 may be based on the request. For example, the sub-step 152 may comprise using the desired precoding settings as indicated by the request.

When the physical layer packet has been received by the receiver for the second type user in step 250, the method 200 comprises controlling interference mitigation based on that the data field of the physical layer packet is empty for the first type user, as illustrated by step 270.

For example, when a default interference mitigation approach (e.g., interference cancellation—IC) is normally used to unveil a stream of a multi-user physical layer packet from the influence of one or more other streams, step 270 may comprise using another interference mitigation approach (e.g., interference suppression) to unveil the second stream of the physical layer packet from the influence of the first stream; at least for the data field.

When the physical layer packet is received by the receiver for the first type user in step 350, the method 300 comprises performing channel estimation based on at least one measurement signal for channel estimation comprised in the physical layer packet for the first stream (e.g., in the preamble of the packet, and/or in one or more midambles of the packet, and/or in a packet extension field of the packet), as illustrated by step 360. The channel estimation may be performed according to any suitable approach (e.g., according to any known approach for channel estimation).

Generally, the result of the channel estimation may be used for any suitable purpose. For example, the channel estimation result (e.g., in the form of channel state information, CSI) may be used for positioning and/or radio environment derivation (e.g., in the context of WLAN sensing). Alternatively or additionally, the channel estimation result may be used for radio calibration.

Advantages achieved by step 270 include that the interference mitigation may be more adequate, and/or more resource efficient, and/or more accurate, than if step 270 was not applied.

When the channel estimation result is used for sensing (e.g., WLAN sensing), the sensing may be performed according to any suitable approach (e.g., according to any known approach for sensing). For example, use of the channel estimation result for sensing may comprise transmitting the channel estimation result to a central processing node configured to perform WLAN sensing and/or reporting the channel estimation result to a higher layer of a protocol stack.

In some embodiments, a sensing method (e.g., a WLAN sensing method) comprises causing execution of the method 300 in a plurality of sensing devices, collection of corresponding channel estimation results, and using machine learning to provide sensing results (e.g., positioning information and/or radio environment information) based on statistics of the collected channel estimation results. Such a sensing method may be performed in a sensing device (e.g., one of the receivers executing the method 300) or in a central node associated with the plurality of sensing devices.

In any case, the receiver for the first type user refrains from processing of a data field of the physical layer packet, as illustrated in step 370. In this context, processing of the data field may comprise any suitable processing (e.g., any attempt to demodulate and decode the data field).

Since the data field is empty for the first stream, processing of the data field would be wasteful. Thus, an advantage achieved by step 370 is that the reception of the multi-user physical layer packet is more resource efficient than if step 370 was not applied.

In association with transmitting the physical layer packet, the method 100 may further comprise transmitting an announcement indicating that the data field of the physical layer packet is empty for the first stream (e.g., by indicating the first stream), as illustrated by optional step 120. The methods 200 and 300 may correspondingly comprise receiving the announcement, as illustrated by optional steps 220 and 320. It should be noted that, in other embodiments, the information of the announcement may be already known to the receivers, implicitly conveyed, or announced from a central node.

Generally, the announcement may be transmitted before the physical layer packet or in combination with the physical layer packet. For example, the announcement may be comprised in one or more of: a broadcast signal, a beacon signal, a receiver-dedicated signal, and a header field (e.g., in a preamble) of the physical layer packet.

In some embodiments, the announcement further informs the sensing device about the transmitter configuration(s) used for the first and/or second streams. For example, the announcement may be indicative of precoding settings (e.g., by comprising precoding setting indices corresponding to the precoding setting(s) used).

The methods 100, 200, 300 (or parts thereof) may be repeated for a plurality of physical layer packets, as suitable. For example, a single execution of steps 120/220/320 may be followed by repetitive execution of steps 140/150/250/270/350/360/370 for a corresponding collection (burst) of physical layer packets. Thus, the announcement (and/or the request) may be associated with a collection of physical layer packets.

Typically, each packet in the collection of physical layer packets may be associated with the same receiver for the first type user. According to some embodiments, the same transmitter configuration may be used for the first stream in each packet in the collection of physical layer packets.

This may be beneficial due to that the sensing performance may be improved when the transmitter configuration of the measurement signals for channel estimation does not change from one packet to the next. When registering channel estimation changes, a sensing device cannot distinguish if the changes are due to variations in the propagation environment (i.e., relevant to sensing) or if the changes are due to modifications of the transmitter configuration (i.e., typically not necessarily relevant for sensing).

The packets in the collection of physical layer packets may be associated with the same, or different, receiver for the second type user. Different transmitter configurations may be used for the second stream in different packets in the collection of physical layer packets (e.g., due to the packets being associated with different receivers for the second type user and/or due to mobility of receivers for the second type user).

Figure 4:
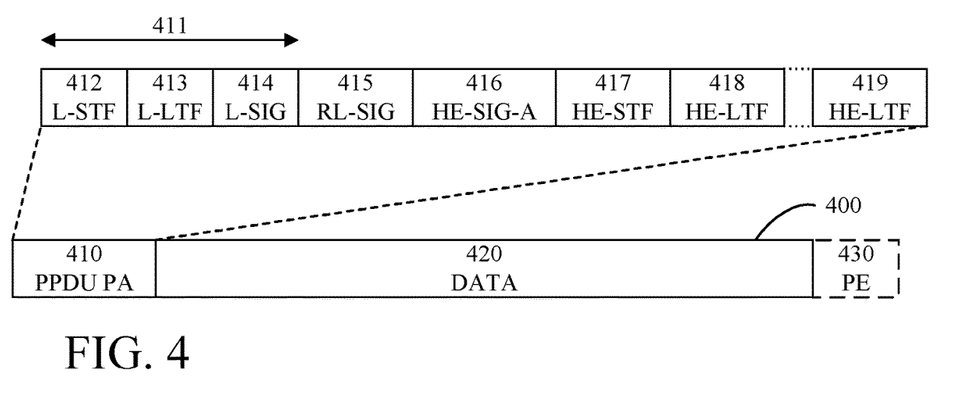
FIG. 4 is a schematic drawing illustrating an example physical layer packet according to some embodiments.

FIG. 4 schematically illustrates an example physical layer packet 400 according to some embodiments. The example physical layer packet 400 may be applicable in the context described above for the methods of FIGS. 1, 2 and 3, for example. Thus, the structure of the example physical layer packet 400 may be used to transmit the first and second streams as described above.

The physical layer packet 400 has a preamble (PA) 410 and a data field 420. The data field may (or may not) be provided with one or more midambles, each of which may (or may not) comprise one or more measurement signals for channel estimation. The preamble may also comprise one or more measurement signals for channel estimation.

FIG. 4 also illustrates an example content of the preamble for an IEEE 802.11 PPDU: a legacy short training field (L-STF) 412, a legacy long training field (L-LTF) 413, a legacy signal field (L-SIG) 414, a repeated legacy signal field (RL-SIG) 415, a high efficiency signal field A (HE-SIG-A) 416, a high efficiency short training field (HE-STF) 417, and two or more high efficiency long training fields (HE-LTF) 418, 419.

The physical layer packet may also comprise a packet extension (PE) field 430. In some embodiments, the PE field may be used to carry one or more measurement signals for channel estimation, or any other PE field content.

When the physical layer packet 400 is an IEEE 802.11 PPDU, a measurement signal for channel estimation may be an LTF or a HE-LTF.

An exemplification of some embodiments applied in the context of IEEE 802.11 WLAN will be given in the following.

An example high efficiency (HE) MU PPDU format is illustrated in FIG. 4. The long training fields (LTF) are OFDM symbols intended for channel estimation. There are two types of LTFs; legacy (L-LTF) and high efficiency (HE-LTF). In a MU PPDU, the L-LTFs are typically transmitted in single-input single-output (SISO) mode, using cyclic shift diversity. Further, the L-LTFs typically use a subcarrier spacing of 312.5 kHz and cover a bandwidth of 16.25 MHz (52 subcarriers). The HE-LTFs can be transmitted in MIMO mode. Furthermore, the HE-LTFs typically use a subcarrier spacing of 78.125 kHz and cover a bandwidth of 18.9 MHz (242 subcarriers).

The IEEE 802.11 standard provides support for interference cancellation (IC) for multi-user (MU) multiple-input multiple-output (MIMO) communication. Typically, each STA that receives data in a MU PPDU may be able to determine which spatial stream(s) are intended for it. The STA receives as many LTFs/PPDUs as needed in order to estimate the channels for all of the used spatial streams and may perform interference cancellation (IC) based on the channel estimation.

The improvement achievable by application of some embodiments is illustrated by means of an example, wherein a transmitter (e.g., an access point—AP) has four transmitter chains and transmits one spatial stream to each of two STAs (a first, sensing, STA and a second, non-sensing, STA). Each STA has two receiver chains in this example. The signals received by the STAs are denoted w and x, respectively, and the STAs are indexed by k=1,2. The signal received at the receiver chain antennas of the STAs can be represented as $$\begin{bmatrix} w_{2\times 1} \\ x_{2\times 1} \end{bmatrix} = \begin{bmatrix} H_{1,2\times 4} \\ H_{2,2\times 4} \end{bmatrix} [W_{1,4\times 1} \; W_{2,4\times 1}] \begin{bmatrix} s_1 \\ s_2 \end{bmatrix} + n_{4\times 1},$$

where $H_{k,2\times 4}$ denotes the propagation channels, $W_{k,4\times 1}$ denotes the transmitter precoding settings, $s_k$ denotes the transmitted data symbols, and $n_{4\times 1}$ is a noise vector. The matrix dimensions are shown as subscripts for matrix-valued quantities.

The equivalent channel for the first STA (comprising the propagation channel and the precoding) may be represented as $$G_{1,2\times 2} = [H_{1,2\times 4} \cdot W_{1,4\times 1} H_{2,2\times 4} \cdot W_{2,4\times 1}],$$

and correspondingly for the second STA. The MU PPDU format in WLAN enables the STAs to compute the equivalent channels. For example, the first STA can use the LTFs in the MU PPDU preamble to estimate $G_{1,2\times 2}$, and correspondingly for the second STA. Thus, the STAs may use symbols $s_k$ that correspond to frequency domain LTF symbols, which are known a-priori at the receivers.

The AP may select the precoding settings to cancel (or otherwise reduce) inter-stream interference. This can be accomplished by ensuring that $H_{n,2\times 4} \cdot W_{m,4\times 1} = 0_{2\times 1}$ whenever m≠n. However, due to time varying nature of the channel and/or estimation inaccuracies (e.g., due to quantization errors and/or noise), the receivers (STAs) may experience some inter-stream interference even if the AP has chosen the precoding settings to attempt to eliminate it. This residual inter-stream interference may limit the performance for sensing and/or data communication.

The STAs may use estimations of the equivalent channels to suppress the inter-stream interference, for example by means of a minimum mean square error (MMSE) equalizer. For example, if σ2 represents the noise power at the receiver, the first STA can obtain an estimate $\hat{s}_1$ of its data symbol $s_1$ according to $$\begin{bmatrix} \hat{s}_1 \\ \hat{s}_2 \end{bmatrix} = (G_{1,2\times 2})^H \cdot (\sigma^2 I_{2\times 2} + G_{1,2\times 2}(G_{1,2\times 2})^H)^{-1} \cdot w_{2\times 1}.$$

According to some embodiments, the AP and the sensing STA may negotiate one or more characteristics of the precoding setting (e.g., the sensing STA may request omnidirectional or sectorized transmission), and the precoding setting applied to non-sensing STA LTF symbols may be selected to be orthogonal to the channels of the sensing STAs, i.e., selection such that $H_{1,2\times 4} \cdot W_{2,4\times 1} = 0_{2\times 1}$. The latter is a way to express that the transmission to non-sensing STAs have null(s) placed in the direction(s) of sensing STAs, to avoid that channel estimations at the sensing STAs are contaminated by inter-stream interference. Thus, the equivalent channel for the the sensing STA is $$G_{1,2\times 2} \approx [H_{1,2\times 4} \cdot W_{1,4\times 1} 0_{2\times 1}],$$

and the sensing STA can use symbols $s_k$ that correspond to frequency domain LTF symbols to estimate the channel $H_{1,2\times 4} \cdot W_{1,4\times 1}$ from the AP to it, which is typically all that is required for sensing purposes.

Due to that the data field is left empty for transmission to sensing STAs, some embodiments may comprise that there is no requirement on orthogonality between the precoding setting applied to sensing STA LTF symbols and the channels of the non-sensing STAs, i.e., it may be allowed that $H_{2,2\times 4} \cdot W_{1,4\times 1} \neq 0_{2\times 1}$. The lack of requirement of orthogonality may be useful since it is not always be possible to design $W_{1,4\times 1}$ to be orthogonal to $H_{2,2\times 4}$. Furthermore, since it is typically desirable to keep $W_{1,4\times 1}$ fixed within a burst of PPDUs for sensing, it may be impossible to maintain orthogonality when different PPDUs within the burst are for different non-sensing STAs and/or when a non-sensing STA is moving. Thus, the equivalent channel for the non-sensing STA is $$G_{2,2\times 2} = [H_{2,2\times 4} \cdot W_{1,4\times 1} H_{2,2\times 4} \cdot W_{2,4\times 1}],$$

which the non-sensing STA may estimate based on symbols $s_k$ that correspond to frequency domain LTF symbols.

When the symbols $s_k$ correspond to frequency domain data symbols, the spatial streams corresponding to the sensing STAs are left empty (i.e., $s_1=0$). Thus, the signal received at the receiver chain antennas of the STAs can be represented as $$\begin{bmatrix} w_{2\times 1} \\ x_{2\times 1} \end{bmatrix} = \begin{bmatrix} H_{1,2\times 4} \\ H_{2,2\times 4} \end{bmatrix} [W_{1,4\times 1} \; W_{2,4\times 1}] \begin{bmatrix} 0 \\ s_2 \end{bmatrix} + n_{4\times 1}.$$

For the non-sensing STA the received signal is $$x_{2\times 1} = G_{2,2\times 2} \begin{bmatrix} 0 \\ s_2 \end{bmatrix} + n_{2\times 1},$$

which may be rewritten as $x_{2\times 1} = \tilde{G}_{2,2\times 1} \cdot s_2 + n_{2\times 1}$, where $\tilde{G}_{2,2\times 1} = [H_{2,2\times 4} \cdot W_{2,4\times 1}]$. Since the non-sensing STA knows which spatial streams are intended for sensing STA(s) and has estimated the entries of $\tilde{G}_{2,2\times 1}$ using the LTFs, it can estimate the transmitted data symbol $\hat{s}_2$ using interference suppression as $$\hat{s}_2 = (\tilde{G}_{2,2\times 1})^H \cdot (\sigma^2 I_{2\times 2} + \tilde{G}_{2,2\times 1}(\tilde{G}_{2,2\times 1})^H)^{-1} \cdot x_{2\times 1},$$

and interference cancellation between streams is not needed. Since the data filed is left empty in streams for sensing STAs, there is no (or very little) loss of performance in the non-sensing STAs.

Figure 5:
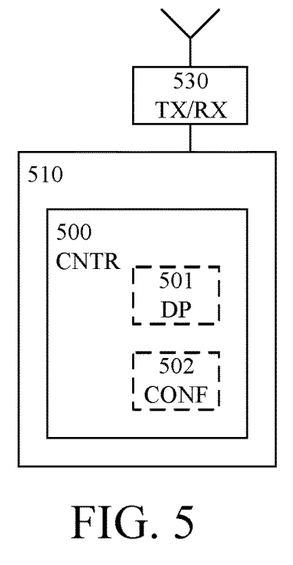
FIG. 5 is a schematic block diagram illustrating an example apparatus according to some embodiments.

FIG. 5 schematically illustrates an example apparatus 510 according to some embodiments. The apparatus is for a transmitter (TX; e.g., transmitting circuitry or a transmission module)—illustrated herein as part of a transceiver (TX/RX) 530—configured to transmit more than one spatially multiplexed streams comprised in a multi-user physical layer packet for a plurality of users comprising a first type user and a second type user, wherein a first stream is assigned for the first type user and a second stream is assigned for the second type user.

The apparatus 510 and/or the transceiver 530 may be comprised in a transmitter device (e.g., a non-sensing device), such as a wireless communication device. An example wireless communication device is a station (STA; e.g., an access point, AP) configured for operation in accordance with IEEE 802.11.

For example, the apparatus 510 may be configured to perform, or cause performance of, one or more of the method steps described in connection with FIG. 1. Any suitable feature described above, in connection with FIG. 1 or otherwise, may be equally applicable for the context of FIG. 5, even if all details are not repeated below.

The apparatus 510 comprises a controller (CNTR; e.g., controlling circuitry or a control module) 500.

The controller is configured to cause a data field of the physical layer packet to be left empty for the first type user (compare with step 130 of FIG. 1).

To this end, the controller may be associated with (e.g., connectable, or connected, to) a data provider (DP; e.g., data providing circuitry or a data provision module) 501. The data provider 501 may be adapted to leave the data field of the physical layer packet empty for the first type user.

The controller is also configured to cause control of a spatial emission pattern associated with the second type user for the physical layer packet for provision of second type user emission strength, in a spatial direction towards the first type user, that falls below a threshold value by (compare with step 140 of FIG. 1).

To this end, the controller may be associated with (e.g., connectable, or connected, to) a configurer (CONF; e.g., configuring circuitry or a configuration module) 502. The configurer may be adapted to control the spatial emission pattern associated with the second type user.

The controller is also configured to cause transmission of the physical layer packet (compare with step 150 of FIG. 1).

To this end, the controller may be associated with (e.g., connectable, or connected, to) a transmitter (e.g., transmitting circuitry or a transmission module); here illustrated as part of the transceiver 530. The transmitter may be adapted to transmit the physical layer packet.

The controller may also be configured to cause reception of a request for measurement signal(s).

To this end, the controller may be associated with (e.g., connectable, or connected, to) a receiver (e.g., receiving circuitry or a reception module); here illustrated as part of the transceiver 530. The receiver may be adapted to receive the request.

The controller may also be configured to cause transmission of an announcement (compare with step 120 of FIG. 1).

To this end, the controller may be associated with (e.g., connectable, or connected, to) a transmitter (e.g., transmitting circuitry or a transmission module); here illustrated as part of the transceiver 530. The transmitter may be adapted to transmit the announcement.

The controller may also be configured to cause use of a first transmitter configuration for the first stream and use of a second transmitter configuration for the second stream (compare with sub-step 152 of FIG. 1).

To this end, the controller may be associated with (e.g., connectable, or connected, to) a configurer (CONF; e.g., configuring circuitry or a configuration module), such as the configurer 502. The configurer may be adapted to configure the transmitter with the first and second transmitter configurations.

The configurer adapted to control the spatial emission pattern associated with the second type user and the configurer adapted to configure the transmitter with the first and second transmitter configurations may be combined in a single configurer, as illustrated by 502, or may comprise two separate configurers.

Figure 6:
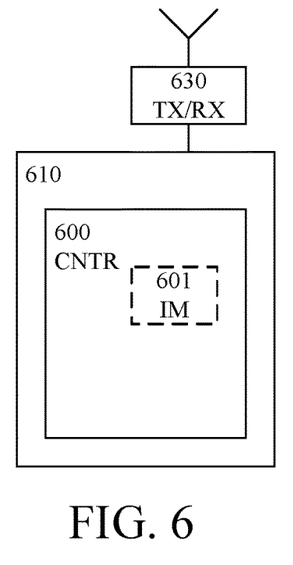
FIG. 6 is a schematic block diagram illustrating an example apparatus according to some embodiments.

FIG. 6 schematically illustrates an example apparatus 610 according to some embodiments. The apparatus is for a receiver (RX; e.g., receiving circuitry or a reception module)—illustrated herein as part of a transceiver (TX/RX) 630—configured to receive a multi-user physical layer packet.

The apparatus 610 and/or the transceiver 630 may be comprised in a receiver device (e.g., a non-sensing device), such as a wireless communication device. An example wireless communication device is a station (STA; e.g., a non-AP STA) configured for operation in accordance with IEEE 802.11.

For example, the apparatus 610 may be configured to perform, or cause performance of, one or more of the method steps described in connection with FIG. 2. Any suitable feature described above, in connection with FIG. 2 or otherwise, may be equally applicable for the context of FIG. 6, even if all details are not repeated below.

The apparatus 610 comprises a controller (CNTR; e.g., controlling circuitry or a control module) 600.

The controller is configured to cause reception of a multi-user physical layer packet comprising more than one spatially multiplexed streams, wherein a first stream is assigned for a first type user and a second stream is assigned for the second type user (compare with step 250 of FIG. 2).

To this end, the controller may be associated with (e.g., connectable, or connected, to) a receiver (e.g., receiving circuitry or a reception module); here illustrated as part of the transceiver 630. The receiver may be adapted to receive the physical layer packet.

The controller is also configured to cause control of interference mitigation based on that a data field of the physical layer packet is empty for the first type user (compare with step 270 of FIG. 2).

To this end, the controller may be associated with (e.g., connectable, or connected, to) an interference mitigator (IM; e.g., interference mitigating circuitry or an interference mitigation module) 601. The interference mitigator 601 may be adapted to control the interference mitigation.

The controller may also be configured to cause reception of an announcement (compare with step 220 of FIG. 2).

To this end, the controller may be associated with (e.g., connectable, or connected, to) a receiver (e.g., receiving circuitry or a reception module); here illustrated as part of the transceiver 630. The receiver may be adapted to receive the announcement.

Figure 7:
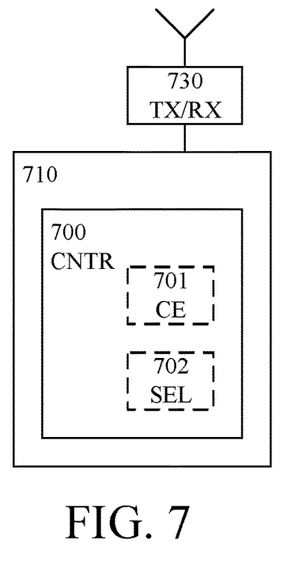
FIG. 7 is a schematic block diagram illustrating an example apparatus according to some embodiments.

FIG. 7 schematically illustrates an example apparatus 710 according to some embodiments. The apparatus is for a receiver (RX; e.g., receiving circuitry or a reception module)—illustrated herein as part of a transceiver (TX/RX) 730—configured to receive a multi-user physical layer packet.

The apparatus 710 and/or the transceiver 730 may be comprised in a receiver device (e.g., a sensing device), such as a wireless communication device. An example wireless communication device is a station (STA; e.g., a non-AP STA) configured for operation in accordance with IEEE 802.11.

For example, the apparatus 710 may be configured to perform, or cause performance of, one or more of the method steps described in connection with FIG. 3. Any suitable feature described above, in connection with FIG. 3 or otherwise, may be equally applicable for the context of FIG. 7, even if all details are not repeated below.

The apparatus 710 comprises a controller (CNTR; e.g., controlling circuitry or a control module) 700.

The controller is configured to cause reception of a multi-user physical layer packet comprising more than one spatially multiplexed streams, wherein a first stream is assigned for a first type user and a second stream is assigned for the second type user (compare with step 350 of FIG. 3).

To this end, the controller may be associated with (e.g., connectable, or connected, to) a receiver (e.g., receiving circuitry or a reception module); here illustrated as part of the transceiver 730. The receiver may be adapted to receive the physical layer packet.

The controller is also configured to cause performance of channel estimation based on the at least one measurement signal for channel estimation (compare with step 360 of FIG. 3).

To this end, the controller may be associated with (e.g., connectable, or connected, to) a channel estimator (CE; e.g., channel estimating circuitry or a channel estimation module) 701. The channel estimator 701 may be adapted to perform channel estimation based on the measurement signal(s) for channel estimation.

The controller is also configured to cause refraining from processing of a data field of the physical layer packet (compare with step 370 of FIG. 3).

To this end, the controller may be associated with (e.g., connectable, or connected, to) a selector (SEL; e.g., selecting circuitry or a selection module) 702. The selector 702 may be adapted to select fields for processing, including not selecting the data field of the physical layer packet.

The controller may also be configured to cause use of a channel estimation result for sensing (e.g., WLAN sensing). For example, causing the use of the channel estimation result for sensing may comprise transmitting the channel estimation result to a central processing node configured to perform WLAN sensing and/or reporting the channel estimation result to a higher layer of a protocol stack.

The controller may also be configured to cause transmission of a request for measurement signal(s).

To this end, the controller may be associated with (e.g., connectable, or connected, to) a transmitter (e.g., transmitting circuitry or a transmission module); here illustrated as part of the transceiver 730. The transmitter may be adapted to transmit the request.

The controller may also be configured to cause reception of an announcement (compare with step 320 of FIG. 3).

To this end, the controller may be associated with (e.g., connectable, or connected, to) a receiver (e.g., receiving circuitry or a reception module); here illustrated as part of the transceiver 730. The receiver may be adapted to receive the announcement.

The described embodiments and their equivalents may be realized in software or hardware or a combination thereof. The embodiments may be performed by general purpose circuitry.

Examples of general purpose circuitry include digital signal processors (DSP), central processing units (CPU), co-processor units, field programmable gate arrays (FPGA) and other programmable hardware. Alternatively or additionally, the embodiments may be performed by specialized circuitry, such as application specific integrated circuits (ASIC). The general purpose circuitry and/or the specialized circuitry may, for example, be associated with or comprised in an apparatus such as a wireless communication device (e.g., a station—STA—such as an access point—AP—or a non-AP STA).

Embodiments may appear within an electronic apparatus (such as a wireless communication device) comprising arrangements, circuitry, and/or logic according to any of the embodiments described herein. Alternatively or additionally, an electronic apparatus (such as a wireless communication device) may be configured to perform methods according to any of the embodiments described herein.

Figure 8:
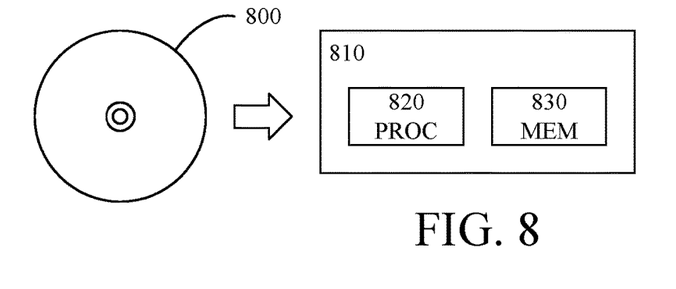
FIG. 8 is a schematic drawing illustrating an example computer readable medium according to some embodiments.

According to some embodiments, a computer program product comprises a tangible, or non-tangible, computer readable medium such as, for example a universal serial bus (USB) memory, a plug-in card, an embedded drive or a read only memory (ROM). FIG. 8 illustrates an example computer readable medium in the form of a compact disc (CD) ROM 800. The computer readable medium has stored thereon a computer program comprising program instructions. The computer program is loadable into a data processor (PROC; e.g., data processing circuitry or a data processing unit) 820, which may, for example, be comprised in a wireless communication device 810. When loaded into the data processor, the computer program may be stored in a memory (MEM) 830 associated with or comprised in the data processor. According to some embodiments, the computer program may, when loaded into and run by the data processor, cause execution of method steps according to, for example, any of the methods illustrated in FIGS. 1-3 or otherwise described herein.

Generally, all terms used herein are to be interpreted according to their ordinary meaning in the relevant technical field, unless a different meaning is clearly given and/or is implied from the context in which it is used.

Reference has been made herein to various embodiments. However, a person skilled in the art would recognize numerous variations to the described embodiments that would still fall within the scope of the claims.

For example, the method embodiments described herein discloses example methods through steps being performed in a certain order. However, it is recognized that these sequences of events may take place in another order without departing from the scope of the claims. Furthermore, some method steps may be performed in parallel even though they have been described as being performed in sequence. Thus, the steps of any methods disclosed herein do not have to be performed in the exact order disclosed, unless a step is explicitly described as following or preceding another step and/or where it is implicit that a step must follow or precede another step.

In the same manner, it should be noted that in the description of embodiments, the partition of functional blocks into particular units is by no means intended as limiting. Contrarily, these partitions are merely examples. Functional blocks described herein as one unit may be split into two or more units. Furthermore, functional blocks described herein as being implemented as two or more units may be merged into fewer (e.g. a single) unit.

Any feature of any of the embodiments disclosed herein may be applied to any other embodiment, wherever suitable. Likewise, any advantage of any of the embodiments may apply to any other embodiments, and vice versa.

Hence, it should be understood that the details of the described embodiments are merely examples brought forward for illustrative purposes, and that all variations that fall within the scope of the claims are intended to be embraced therein.

The invention claimed is:

1. A method of a transmitter configured to transmit more than one spatially multiplexed streams comprised in a multi-user physical layer packet for a plurality of users comprising a first type user and a second type user, a first stream being assigned for the first type user and a second stream being assigned for the second type user, the method comprising:
   leaving a data field of the physical layer packet empty for the first type user;
   providing second type user emission strength, in a spatial direction towards the first type user, that falls below a threshold value by controlling a spatial emission pattern associated with the second type user for the physical layer packet;
   transmitting the physical layer packet
   the first type user being a wireless communication device configured to use the physical layer packet for wireless local area network (WLAN) sensing and the second type user being a wireless communication device configured to use the physical layer packet for data reception.

2. The method of claim 1, further comprising transmitting an announcement indicative of that the data field of the physical layer packet is empty for the first stream.

3. The method of claim 2, wherein the announcement is comprised in one or more of: a broadcast signal, a beacon signal, a receiver-dedicated signal, and a header field of the physical layer packet.

4. The method of claim 1, wherein transmitting the physical layer packet comprises using a first transmitter configuration for the first stream and using a second transmitter configuration for the second stream.

5. A method of a receiver for a second type user, the method comprising:
   receiving a multi-user physical layer packet comprising more than one spatially multiplexed streams, a first stream being assigned for a first type user and a second stream being assigned for the second type user;
   controlling interference mitigation based on that a data field of the physical layer packet is empty for the first type user; and
   the first type user being a wireless communication device configured to use the physical layer packet for wireless local area network (WLAN) sensing and the second type user being a wireless communication device configured to use the physical layer packet for data reception.

6. The method of claim 5, further comprising receiving an announcement indicative of that the data field of the physical layer packet is empty for the first stream.

7. The method of claim 5, wherein a default interference mitigation comprises interference cancellation, and wherein controlling interference mitigation comprises applying interference suppression for the first stream instead of interference cancellation.

8. A method of a receiver for a first type user, the method comprising:
   receiving a multi-user physical layer packet comprising more than one spatially multiplexed streams, wherein a first stream is assigned for the first type user and a second stream is assigned for a second type user;
   performing channel estimation based on at least one measurement signal for channel estimation comprised in the physical layer packet for the first stream;
   refraining from processing of a data field of the physical layer packet; and
   the first type user being a wireless communication device configured to use the physical layer packet for wireless local area network (WLAN) sensing and the second type user being a wireless communication device configured to use the physical layer packet for data reception.

9. The method of claim 8, further comprising receiving an announcement indicative of that the data field of the physical layer packet is empty for the first stream.

10. The method of claim 8, further comprising using a channel estimation result for wireless local area network (WLAN) sensing.

11. An apparatus for a transmitter configured to transmit more than one spatially multiplexed streams comprised in a multi-user physical layer packet for a plurality of users comprising a first type user and a second type user, a first stream being assigned for the first type user and a second stream being assigned for the second type user, the apparatus comprising controlling circuitry configured to cause:
   a data field of the physical layer packet to be left empty for the first type user;
   provision of second type user emission strength, in a spatial direction towards the first type user, that falls below a threshold value by control of a spatial emission pattern associated with the second type user for the physical layer packet;
   transmission of the physical layer packet; and
   the first type user being a wireless communication device configured to use the physical layer packet for wireless local area network (WLAN) sensing and the second type user being a wireless communication device configured to use the physical layer packet for data reception.

12. The apparatus of claim 11, wherein the controlling circuitry is further configured to cause transmission of an announcement indicative of that the data field of the physical layer packet is empty for the first stream.

13. The apparatus of claim 12, wherein the announcement is comprised in one or more of: a broadcast signal, a beacon signal, a receiver-dedicated signal, and a header field of the physical layer packet.

14. The apparatus of claim 11, wherein the controlling circuitry is configured to cause the transmission of the physical layer packet by causing use of a first transmitter configuration for the first stream and use of a second transmitter configuration for the second stream.

15. An apparatus for a receiver for a second type user, the apparatus comprising controlling circuitry configured to cause:
   reception of a multi-user physical layer packet comprising more than one spatially multiplexed streams, a first stream being assigned for a first type user and a second stream being assigned for the second type user;
   control of interference mitigation based on that a data field of the physical layer packet is empty for the first type user; and
   the first type user being a wireless communication device configured to use the physical layer packet for wireless local area network (WLAN) sensing and the second type user is a wireless communication device configured to use the physical layer packet for data reception.

16. The apparatus of claim 15, wherein the controlling circuitry is further configured to cause reception of an announcement indicative of that the data field of the physical layer packet is empty for the first stream.

17. The apparatus of claim 15, wherein a default interference mitigation comprises interference cancellation, and wherein control of interference mitigation comprises application of interference suppression for the first stream instead of interference cancellation.

18. An apparatus for a receiver for a first type user, the apparatus comprising controlling circuitry configured to cause:
   reception of a multi-user physical layer packet comprising more than one spatially multiplexed streams, a first stream being assigned for the first type user and a second stream being assigned for a second type user;
   performance of channel estimation based on at least one measurement signal for channel estimation comprised in the physical layer packet for the first stream;
   refraining from processing of a data field of the physical layer packet; and
   the first type user being a wireless communication device configured to use the physical layer packet for wireless local area network (WLAN) sensing and the second type user being a wireless communication device configured to use the physical layer packet for data reception.

19. The apparatus of claim 18, wherein the controlling circuitry is further configured to cause reception of an announcement indicative of that the data field of the physical layer packet is empty for the first stream.

20. The apparatus of claim 18, wherein the controlling circuitry is further configured to cause use of a channel estimation result for wireless local area network (WLAN) sensing.

* * * * *